(12) United States Patent
Kim

(10) Patent No.: US 7,715,376 B2
(45) Date of Patent: May 11, 2010

(54) ROUTING SYSTEM AND METHOD FOR MANAGING FORWARDING INFORMATION THEREIN

(75) Inventor: In-Ho Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 11/636,963

(22) Filed: Dec. 12, 2006

(65) Prior Publication Data

US 2007/0177622 A1 Aug. 2, 2007

(30) Foreign Application Priority Data

Jan. 27, 2006 (KR) ...................... 10-2006-0008947

(51) Int. Cl.
*H04L 12/66* (2006.01)
(52) U.S. Cl. ...................... 370/356; 370/252; 370/235
(58) Field of Classification Search ................. 370/356, 370/252, 235
See application file for complete search history.

(56) References Cited

U.S. PATENT DOCUMENTS 7,003,582 B2* 2/2006 Basso et al. ................. 709/242
7,362,700 B2* 4/2008 Frick et al. .................. 370/219

\* cited by examiner

*Primary Examiner*—Jason E Mattis
*Assistant Examiner*—Kibrom T Hailu
(74) *Attorney, Agent, or Firm*—H.C. Park & Associates, PLC

(57) ABSTRACT

A routing system and a method for managing forwarding information therein includes a table for storing the index of the output interface table which contains the output interface information for transmitting the packets respectively received at the routing controller and the forwarder to the next hop and the index of the MAC table which contains the MAC information necessary to transmit the received packets to the next hop is provided, thereby preventing the packet from being lost during the backup of the forwarding information which is performed by the rebooting of the routing controller. Accordingly, there is no need for a memory for respectively storing the forwarding information before and after the rebooting of the routing controller.

20 Claims, 5 Drawing Sheets

FIG. 4

| DestIP Address | NhdbID 1 | SM |
|---|---|---|
| DestIP Address | NhdbID 2 | SM |
| ⋮ | | |
| DestIP Address | NhdbID n | SM |

| NextIP Address | L2ID 1 |
|---|---|
| NextIP Address | L2ID 2 |
| ⋮ | |
| NextIP Address | L2ID n |

ROUTING SYSTEM AND METHOD FOR MANAGING FORWARDING INFORMATION THEREIN

CLAIM OF PRIORITY

This application makes reference to, incorporates the same herein, and claims all benefits accruing under 35 U.S.C. §119 from an application for ROUTING SYSTEM AND METHOD FOR MANAGING FORWARD INFORMATION IN THEREOF earlier filed in the Korean Intellectual Property Office on 27 Jan. 2006 and there duly assigned Serial No. 10-2006-0008947.

BACKGROUND OF THE INVENTION

1. Field of the Invention

The present invention relates to a routing system and a method for managing forwarding information therein.

2. Description of the Related Art

A router exchanges a routing protocol control message with adjacent routers to collect routing information, and forwards a received packet according to the routing information.

As a demand for high-speed, diversificated Internet services increases, high performance network equipment which accommodates various protocols is required.

The router also undergoes such a change. That is, in order to process a mass of received packets, the router is being systemized, changing from a structure having one routing controller and one forwarder to a structure having one routing controller and at least one forwarder.

The routing system having one routing controller and at least one forwarder is shown in FIG. 1.

As shown in FIG. 1, the routing system includes a routing controller 100 and at least one forwarder 110. The routing controller 100 sets forwarding information from the best and lowest cost routing information while exchanging a routing protocol control message with adjacent routers and provides at least one forwarder 110 with the forwarding information. As the routing protocol, a routing information protocol (RIP), a border gateway protocol (BGP), or an open shortest path first (OSPF) is used. Each forwarder 110 includes a forwarding control module 112, a forwarding table 114, a next hop table 116; and an L2 table 118.

The forwarding control module 112 stores a destination IP (Internet protocol) address in the forwarding information provided from the routing controller 100 and an index of the next hop table 116 storing information about output interface for transmitting a packet having the destination IP address to the next hop, in the forwarding table 114 so that they correspond to each other. The forwarding control module 112 stores, in the forwarding table 116, the output interface information for transmitting the packet having the destination IP address to the next hop, which is contained in the forwarding information provided from the routing controller 100.

The output interface information includes an ID (identification) of a forwarder having the output interface, a maximum transfer unit (MTU) of the output interface, a port ID of the output interface for transmitting the packet having the destination IP address to the next hop, and an index of the L2 table 118 which stores MAC (media access control) address information related to the output interface. The forwarding control module 112 stores, in the L2 table 118, the MAC address information contained in the forwarding information provided from the routing controller 100.

The MAC address information stored in the L2 table 118 includes a MAC address of the forwarder (i.e., source MAC address), a MAC address of the next hop (i.e., destination MAC address), a protocol type, and so on. When the packet is received from the network, the forwarding control module 112 identifies the index of the next hop table 116 corresponding to the destination IP address in the forwarding table 114 by using the destination IP address contained in the received packet.

The forwarding control module 112 identifies the output interface information corresponding to the index of the next hop table 116 in the next hop table 116 by using the identified index of the next hop table 116. That is, the forwarding control module 112 identifies the port ID of the output interface used to forward the received packet to the next hop, the MTU (maximum transfer unit) which is the size of the packet transmitted through the output interface, and the index of the L2 table 112 used to identify the MAC address information.

The forwarding control module 112 identifies the MAC address of the forwarder 110 (i.e., source MAC address) and the MAC address of the next hop (i.e., destination MAC address) in the L2 table 118 using the index of the L2 table 118. Then, the forwarding control module 112 inserts the MAC address of the forwarder 110 and the MAC address of the next hop into the received packet and transmits the packet in a size of the MTU through the output interface port which is identified as the next hop.

In the routing system having the above-described structure, at least one forwarder forwards each received packet using the forwarding information provided from the routing controller. That is, at least one forwarder forwards the received packet using the index of the next hop table 116 and the index of the L2 table 118.

Here, the index of the next hop table 116 and the index of the L2 table 118 are managed and assigned by the routing controller 100, and thus they are the same in the at least one forwarder. The routing controller 110 provides the at least one forwarder 110 with a rebooting message when it is rebooted logically or physically. Then, the routing controller 100 sets new forwarding information from the best and lowest cost routing information while exchanging the routing protocol control message with the adjacent routers and provides the at least one forwarder 110 with the new forwarding information.

The forwarding control module 112 of the at least one forwarder 110 classifies the newly set forwarding information and stores them in the forwarding table 114, the next hop table 116, and the L2 table 118.

However, the forwarding control module 112 may have information corresponding to the index of the arbitrary next hop table 116 and the index of the L2 table 118 among the newly set forwarding information and information corresponding to the index of the arbitrary next hop table 116 and the index of the L2 table 118 among the existing forwarding information.

At this time, the information corresponding to the index of the arbitrary next hop table 116 and the index of the L2 table 118 among the newly set forwarding information may be different from the information corresponding to the index of the arbitrary next hop table 116 and the index of the L2 table 118 among the existing forwarding information. In this instance, the forwarding control module 112 cannot determine which information among the information corresponding to the index of the arbitrary next hop table 116 and the index of the L2 table 118 is used to forward the received packet when the index of the arbitrary next hop table 116 and the index of the L2 table 118 are needed to forward the received packet.

For this reason, the forwarding control module 112 cannot perform the forwarding of the received packet. In order to resolve the problem, the forwarding control module 112 needs to assign the index of the next hop table and the index of the L2 table which are different to information corresponding to the index of the arbitrary next hop table 116 and information corresponding to the L2 table 118 which are different and thereby backs up them before the packet having the destination IP address which corresponds to the index of the arbitrary next hop table 116 and the index of the L2 table 118 is received.

However, the forwarding control module 112 cannot forward the received packet while performing the backup. Thus, the received packet may be lost while the backup is performed by the forwarding control module 112.

In order to prevent the received packet from being lost during the backup, tables for storing the forwarding information received before and after the rebooting of the routing controller 100 can be arranged respectively.

However, if the tables for storing the forwarding information received before and after the rebooting of the routing controller 100 are arranged, a double physical memory capacity is needed, leading to a high manufacturing cost of the routing system.

SUMMARY OF THE INVENTION

It is, therefore, an objective of the present invention to provide a routing system and a method for managing forwarding information therein which are capable of preventing interruption of packet forwarding whether a routing controller is rebooted logically or physically.

It is another object to provide for a table for storing the output interface information for transmitting the packets respectively received at a routing controller and a forwarder, thereby preventing a packet from being lost during the backup of the forwarding information which is performed by the rebooting of a routing controller.

It is yet another object to provide a technique for a routing system that has no need for a memory for storing the forwarding information before and after the rebooting of the routing controller.

A first aspect of the present invention provides a method for managing forwarding information in a routing system having a routing controller and at least one forwarder. The method includes the steps of: setting, at the routing controller, forwarding information from routing information collected by exchanging a routing protocol message with adjacent routers and providing the at least one forwarder with the forwarding information; at the at least one forwarder, storing, in a first table, at least one address information and forwarding ID (identification) information corresponding to the address information which are contained in the forwarding information and providing the routing controller with the first table as the routing controller is rebooted; copying, at the routing controller, the first table to a second table, and when forwarding ID information which corresponds to address information contained in forwarding information re-set from routing information re-collected by exchanging the routing protocol message with the adjacent routers is contained in the second table, providing the at least one forwarder with the address information contained in the re-set forwarding information and the forwarding ID information contained in the second table; and at the at least one forwarder, when the forwarding ID information contained in the second table is contained in the first table, maintaining the forwarding information set before the rebooting of the routing controller which corresponds to the forwarding ID information contained in the second table.

The method may further include the steps of: when the forwarding ID information corresponding to the address information contained in the re-set forwarding information is not contained in the second table, setting, at the routing controller, forwarding ID information corresponding to the address information contained in the re-set forwarding information and providing the at least one forwarder with the forwarding ID information together with the address information contained in the re-set forwarding information; and at the at least one forwarder, when the re-set forwarding ID information is contained in the first table, maintaining the forwarding information set before rebooting of the routing controller which corresponds to the re-set forwarding ID information.

The address information and the address information contained in the re-set forwarding information may include at least one of a destination IP address at which a packet received at the at least one forwarder is to be transmitted and a next hop address at which the packet received at the at least one forwarder is to be forwarded.

The forwarding ID information and the forwarding ID information contained in the second table may include at least one of an index of an output interface table which contains output interface information of the at least one forwarder necessary to transmit a packet received at the at least one forwarder to a next hop, output interface MAC information necessary to transmit the packet received at the at least one forwarder to the next hop, and an index of an MAC table which contains MAC information of the next hop.

The first table may include stale mark (SM) information which corresponds to the at least one address information and the forwarding ID corresponding to the at least one address information and which is used for the at least one forwarder to delete the forwarding information corresponding to the forwarding ID information contained in the first table.

The at least one forwarder may include a timer which operates during a set time period.

The re-set forwarding ID information may include at least one of an index of an output interface table which contains output interface information of the at least one forwarder necessary to transmit a packet received at the at least one forwarder to a next hop, output interface MAC information necessary to transmit the packet received at the at least one forwarder to the next hop, and an index of an MAC table which contains MAC information of the next hop.

A second aspect of the present invention provides a routing system, including: a routing controller; and at least one forwarder, wherein the routing controller sets forwarding information from routing information collected by exchanging a routing protocol message with adjacent routers and provides the at least one forwarder with the forwarding information; the at least one forwarder stores, in a first table, at least one address information and forwarding ID information corresponding to the address information which are contained in the forwarding information and provides the routing controller with the first table as the routing controller is rebooted; the routing controller copies the first table to a second table, and when forwarding ID information which corresponds to address information contained in forwarding information re-set from routing information re-collected by exchanging the routing protocol message with the adjacent routers is contained in the second table, provides the at least one forwarder with the address information contained in the re-set forwarding information and the forwarding ID information contained in the second table; and the at least one forwarder, when the forwarding ID information contained in the second table is contained in the first table, maintains the forwarding information set before the rebooting of the routing controller which corresponds to the forwarding ID information contained in the second table.

The routing controller, when the forwarding ID information corresponding to the address information contained in the re-set forwarding information is not contained in the second table, sets forwarding ID information corresponding to the address information contained in the re-set forwarding information and provides the at least one forwarder with the forwarding ID information together with the address information contained in the re-set forwarding information; and the at least one forwarder, when the re-set forwarding ID information is contained in the first table, maintains the forwarding information set before rebooting of the routing controller which corresponds to the re-set forwarding ID information.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 shows a renewal information table according to the present invention.

DETAILED DESCRIPTION OF THE PREFERRED EMBODIMENTS

Hereinafter, exemplary embodiments of the present invention will be described in detail with reference to the accompanying drawings. In the following description, a detailed description of known functions and configurations incorporated herein has been omitted for conciseness.

Figure 1:
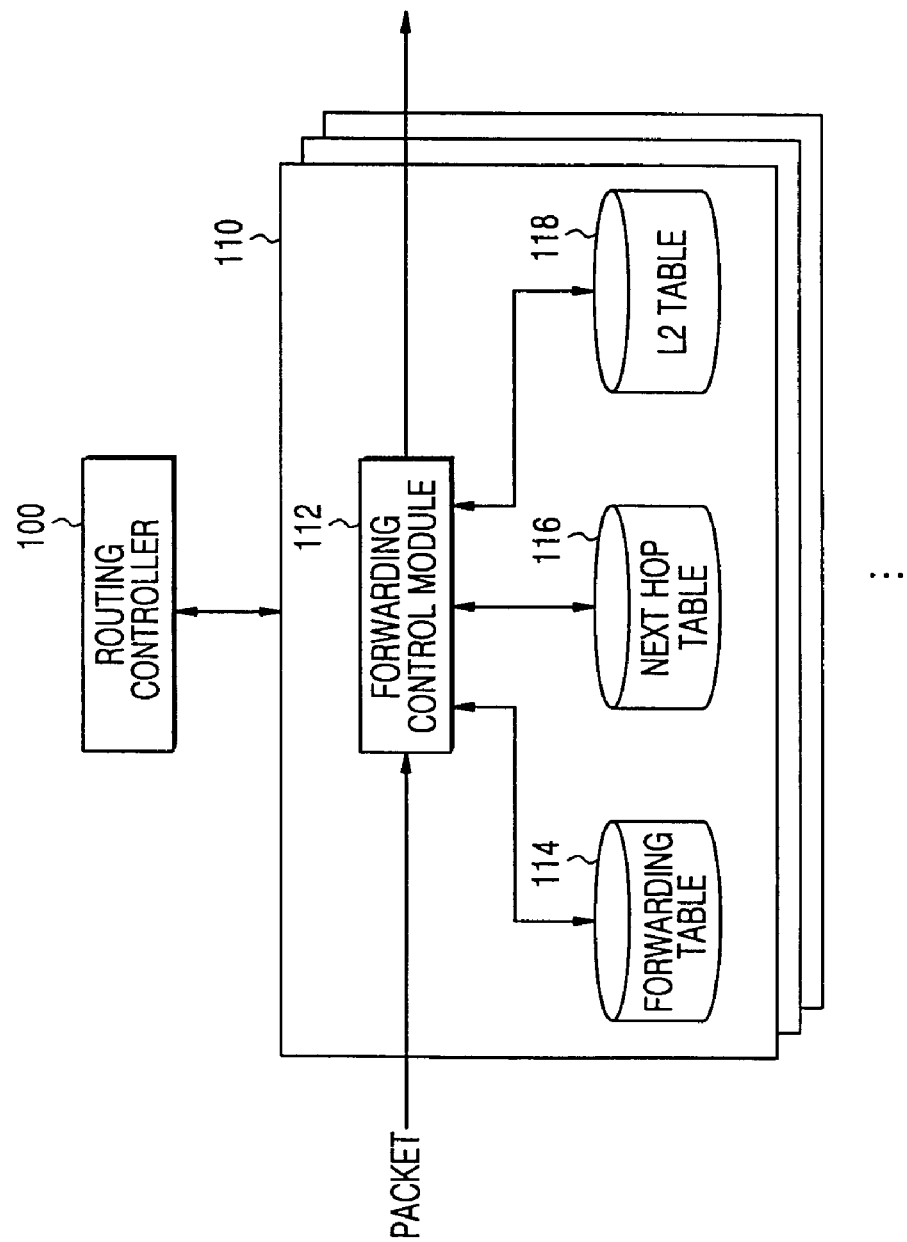
FIG. 1 is a block diagram of a conventional routing system.
Figure 2:
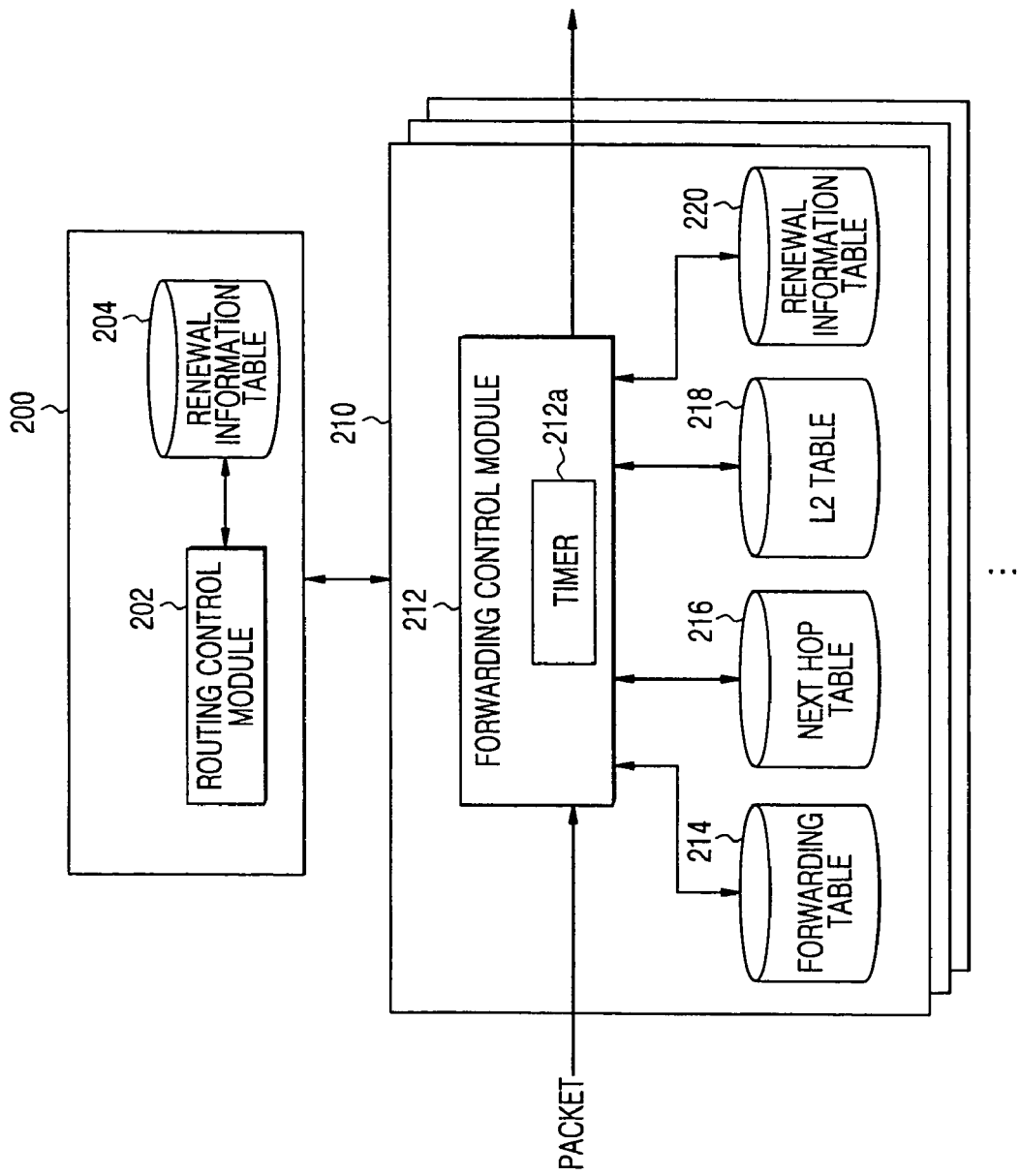
FIG. 2 is a block diagram of a routing system according to an exemplary embodiment of the present invention.

FIG. 2 is a block diagram of a routing system according to an exemplary embodiment of the present invention.

Referring to FIG. 2, the routing system of the present invention includes a routing controller 200 and at least one forwarder 210.

The routing controller 200 includes a routing control module 202 and a renewal information table 204.

The routing control module 202 sets forwarding information from the best and lowest cost routing information while exchanging a routing protocol control message with the adjacent routers and provides the at least one forwarder 210 with the forwarding information. The routing control module 202 stores, in the renewal information table 204, an arbitrary destination IP (Internet protocol) address, an index of the next hop table which stores the output interface information for transmitting a packet having the arbitrary destination IP address to the next hop, a next hop address, and an index of the L2 (layer 2) table which stores the MAC address information related to the output interface such that they are concatenated with each other. As the routing protocol, the RIP, the BGP, or the OSPF is used.

The at least one forwarder 210 includes a forwarding control module 212, a forwarding table 214, a next hop table 216, an L2 table 218, and a renewal information table 220.

The forwarding control module 212 stores in the renewal information table 204, the destination IP address, the index of the next hop table which stores the output interface information for transmitting the packet having the destination IP address to the next hop, the next hop address, and the index of the L2 table which stores the MAC address information related to the output interface, among the forwarding information provided from the routing controller 200, such that a stale mark (SM) bit value corresponds to them. Here, the SM bit value is set to "0."

The forwarding control module 212 stores in the forwarding table 214, the destination IP address, and the index of the next hop table 216 which stores the output interface information for transmitting the packet having the destination IP address to the next hop, among the forwarding information provided from the routing controller 200. The forwarding control module 212 stores, in the next hop table 216, the output interface information for transmitting the packet having the destination IP address to the next hop among the forwarding information provided from the routing controller 200.

The output interface information includes an ID of a forwarder having the output interface, a maximum transfer unit (MTU) of the output interface, a port ID of the output interface for transmitting the packet having the destination IP address to the next hop, and an index of the L2 table 218 which stores MAC address information related to the output interface.

The forwarding control module 212 stores, in the L2 table 218, the MAC address information among the forwarding information provided from the routing controller 200. The MAC address information stored in the L2 table 218 includes a MAC address of the forwarder 210 (i.e., source MAC address), a MAC address of the next hop (i.e., destination MAC address), a protocol type, and so on.

When the packet is received from the network, the forwarding control module 212 identifies the index of the next hop table corresponding to the destination IP address in the forwarding table 214 by using the destination IP address contained in the received packet. The forwarding control module 212 identifies the output interface information corresponding to the index of the next hop table 216 in the next hop table 216 by using the identified index of the next hop table 216. That is, the forwarding control module 212 identifies the output interface port ID used to forward the received packet to the next hop, the MTU which is the size of the packet transmitted through the output interface, and the index of the L2 table 212 used to identify the MAC address information.

The forwarding control module 212 identifies the MAC address of the forwarder 210 (i.e., source MAC address) and the MAC address of the next hop (i.e., destination MAC address) in the L2 table 218 using the index of the L2 table 218. The forwarding control module 212 then inserts the MAC address of the forwarder 210 and the MAC address of the next hop into the received packet and transmits the packet in a size of the MTU through the output interface port which is identified as the next hop.

The routing control module 202 of the routing controller 200 generates a rebooting message when the routing controller 200 is logically or physically rebooted and provides it to the at least one forwarder 210. The forwarding control module 212 of the at least one forwarder 210 sets the SM bit value in the renewal information table 220 to "1" as the rebooting message is received from the routing controller 200 and operates a timer 212a during a set time period. The set forwarder among the at least one forwarder 210 provides its renewal information table to the routing controller 200. The routing control module 202 of the routing controller 200 backs up (i.e., a copy of a program, file, data etc., that is stored separately from the original) the contents of the renewal information table 220 provided from the set forwarder to the renewal information table.

The routing control module 202 sets the forwarding information from the best and lowest cost routing information while exchanging the routing protocol control message with the adjacent routers again.

The routing control module 202 checks the renewal information table 204 to see whether the destination IP address, the index of the next hop table which stores the output interface information for transmission to the next hop corresponding to the next hop address, and the index of the L2 table which stores the MAC address related to the output interface exist or not.

The routing control module 202 inserts the index of the corresponding next hop table and the index of the L2 table 218 into the newly set forwarding information and transmits it to the set forwarder among the at least one forwarder 210 when the destination IP address, the index of the next hop table 216 which stores the output interface information for transmission to the next hop corresponding to the next hop address, and the index of the L2 table 218 which stores the MAC address related to the output interface exist.

The routing control module 202 sets the index of the next hop table and the index of the L2 table 218 which do not exist in the renewal information table 204, and inserts them into the newly set forwarding information and transmits it to the set forwarder among the at least one forwarder 210 when the destination IP address, the index of the next hop table 216 which stores the output interface information for transmission to the next hop corresponding to the next hop address, and the index of the L2 table which stores the MAC address related to the output interface do not exist.

The forwarding control module 212 of the set forwarder 210 receives the rebooting message from the routing controller 200 and checks whether the index of the next hop table contained in the received forwarding information is stored in the renewal information table 220 or not.

The forwarding control module 212 sets the SM bit value corresponding to the index of the next hop table to "0" when the index of the next hop table contained in the received forwarding information is stored in the renewal information table 220. This represents that the next hop table 216 and the L2 table 218 store the same forwarding information as the forwarding information received from the routing controller 200.

The forwarding control module 212 forwards the received packets using the forwarding information stored in the forwarding table 214, the next hop table 216 and the L2 table 218 until the re-set forwarding information is received after the rebooting message is received from the routing controller 200.

The forwarding control module 212 stores, in the renewal information table 204, the destination IP address, the index of the next hop table 216 which stores the output interface information for transmitting the packet having the destination IP address to the next hop, the next hop address, and the index of the L2 table 218 which stores the MAC address information related to the output interface, among the forwarding information provided from the routing controller 200, such that the SM bit value corresponds to them when the index of the next hop table 216 contained in the received forwarding information is not stored in the renewal information table 220 after the rebooting message is received from the routing controller 200. Here, the SM bit value is set to "0."

The forwarding control module 212 stores, in the forwarding table 214, the destination IP address and the index of the next hop table 216 which stores the output interface information for transmitting the packet having the destination IP address to the next hop, among the forwarding information provided from the routing controller 200 after the rebooting message is received. The forwarding control module 212 stores, in the next hop table 216, the output interface information for transmitting the packet having the destination IP address to the next hop, among the forwarding information provided from the routing controller 200 after the rebooting message is received.

The output interface information includes an ID (identification) of a forwarder having the output interface, a maximum transfer unit (MTU) of the output interface, a port ID of the output interface for transmitting the packet having the destination IP address to the next hop, and an index of the L2 table 118 which stores MAC address information related to the output interface. The forwarding control module 212 stores, in the L2 table 218, the MAC address information among the forwarding information provided from the routing controller 200 after the rebooting message is received.

The MAC address information stored in the L2 table 218 includes a MAC address of the forwarder 210 (i.e., source MAC address), a MAC address of the next hop (i.e., destination MAC address), a protocol type, etc. Then, the forwarding control module 212 deletes the routing information corresponding to the index of the next hop table and the index of the L2 table that the SM bit value of the renewal information table 220 is set to "1" from the forwarding table 214, the next hop table 216 and the L2 table 218 when operation of the timer 212a, which begins to operate upon reception of the rebooting message, is terminated after a lapse of the set time.

Figure 3:
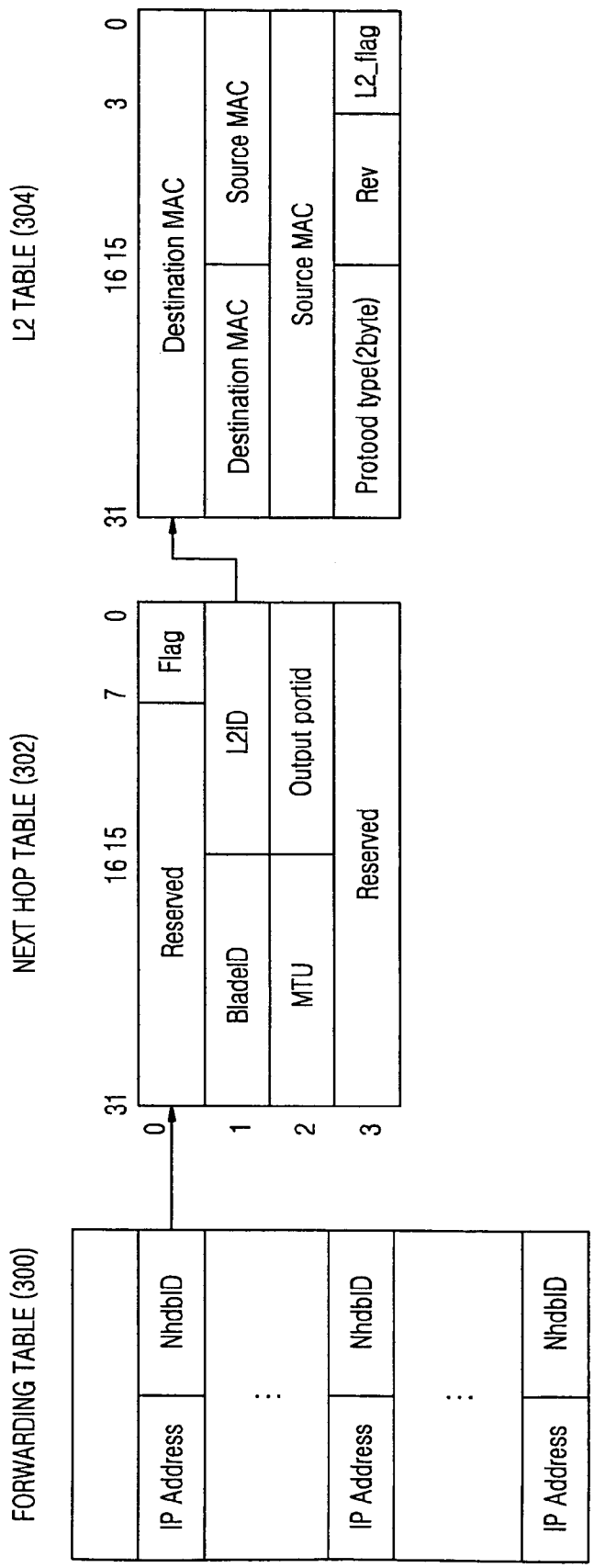
FIG. 3 shows a forwarding table, a next hop table and an L2 table according to the present invention.

FIG. 3 shows a relationship among the forwarding table 300, the next hop table 302 and the L2 table 304 according to the present invention.

As shown in FIG. 3, the forwarding table 300 includes at least one different destination IP address and an index NhdbID (next hop database event identification) of the at least one next hop table which is paired with the at least one different destination IP address. The next hop table 302 stores the output interface information corresponding to the index NhdbID of the at least one next hop table 302 in the forwarding table 300.

The output interface information contains the ID of the forwarder having the output interface, the MTU of the output interface, the port ID of the output interface through which the packet having the destination IP address is transmitted to the next hop, and the index L2ID (layer 2 identification) of the L2 table which stores the MAC address information related to the output interface. The L2 table 304 contains the MAC address information corresponding to the index of the at least one L2 table 304 in the next hop table 302. The MAC address information includes an MAC address of the forwarder (source MAC), an MAC address of the next hop (destination MAC), a protocol type, and so on.

FIG. 4 shows a configuration of the renewal information table according to the present invention.

Figure 5:
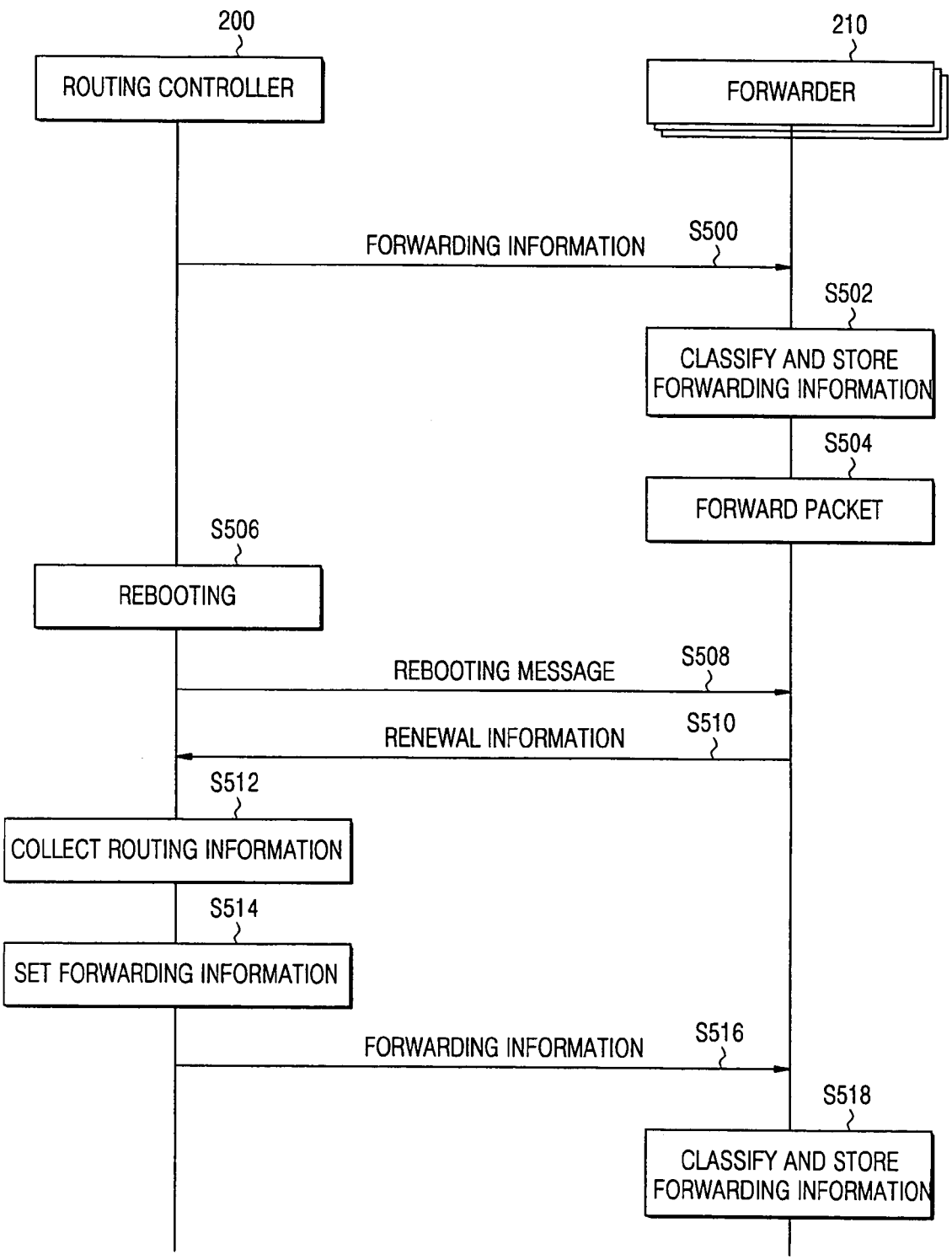
FIG. 5 is a flowchart of a packet forwarding procedure of a routing system according to an exemplary embodiment of the present invention.

As shown in FIG. 4, the renewal information table according to the present invention includes at least one different destination IP address DestIP Address, at least one index NhdbID 1 to NhdbID n of the next hop table corresponding to the at least one different destination IP address, the state mark SM corresponding to the index of the next hop table, at least one different next hop address NextIP Address, and indices L2ID 1 to L2ID n of the L2 table corresponding to the at least one different next hop address NextIP Address FIG. 5 is a flowchart illustrating a packet forwarding procedure of the routing system according to the present invention.

The routing system of FIG. 5 has a similar configuration to the routing system of FIG. 2. That is, the routing system of FIG. 5 includes the routing controller 200 and at least one forwarder 210. The routing controller 200 sets the forwarding information from the best and lowest cost routing information while exchanging the routing protocol control message with the adjacent routers and provides the at least one forwarder 210 with the forwarding information (S500).

At this time, the routing controller 200 stores, in the renewal information table 204, the destination IP address, the index of the next hop table 216 which stores the output interface information for transmitting the packet having the destination IP address to the next hop, the next hop address, and the index of the L2 table 218 which stores the MAC address information related to the output interface such that they are concatenated with each other. Hereinafter, information stored in the renewal information table is referred to as "renewal information." As the routing protocol, the RIP, the BGP, or the OSPF is used. The at least one forwarder 210 classifies the forwarding information provided from the routing controller 200 and stores classified information in the renewal information table 220, the forwarding table 214, the next hop table 216, and the L2 table 218 (S502).

In more detail, the forwarder 210 stores, in the renewal information table 220, the destination IP address, the index of the next hop table 216 which stores the output interface information for transmitting the packet having the destination IP address to the next hop, the next hop address, and the index of the L2 table 218 which stores the MAC address information related to the output interface, among the forwarding information provided from the routing controller 200, such that they correspond to the SM bit value. At this time, the SM bit value is set to "0."

The forwarder 210 stores, in the forwarding table 214, the destination IP address and the index of the next hop table 216 which stores the output interface information for transmitting the packet having the destination IP address to the next hop, among the forwarding information provided from the routing controller 200. The forwarder 210 stores, in the next hop table 216, the output interface information for transmitting the packet having the destination IP address to the next hop among the forwarding information provided from the routing controller 200.

The output interface information includes the ID of the forwarder having the output interface, the MTU of the output interface, the port ID of the output interface for transmitting the packet having the destination IP address to the next hop, and the index of the L2 table 218 which stores MAC address information related to the output interface. The forwarder stores, in the L2 table 218, the MAC address information among the forwarding information provided from the routing controller 200.

The MAC address information stored in the L2 table 218 includes the MAC address of the forwarder 210 (i.e., source MAC address), the MAC address of the next hop (i.e., destination MAC address), the protocol type, etc. As the packet is received, the forwarder 210 processes the forwarding of the received packet using the forwarding table 214, the next hop table 216, and the L2 table 218 (S504).

A process of forwarding the received packet is described below in more detail.

The forwarder 210 identifies the index of the next hop table 216 corresponding to the destination IP address in the forwarding table 214 by using the destination IP address contained in the received packet. The forwarder 210 identifies the output interface information corresponding to the index of the next hop table 216 in the next hop table 216 by using the identified index of the next hop table 216.

That is, the forwarder 210 identifies the output interface port ID used to forward the received packet to the next hop, the MTU which is the size of the packet transmitted through the output interface, and the index of the L2 table 218 used to identify the MAC address information. The forwarder 210 identifies the MAC address of the forwarder 210 (i.e., source MAC address) and the MAC address of the next hop (i.e., destination MAC address) in the L2 table 218 using the index of the L2 table 218. Then, the forwarder 210 inserts the MAC address of the forwarder 210 and the MAC address of the next hop into the received packet and transmits the packet in a size of the MTU through the output interface port which is identified as the next hop.

The routing controller 200 checks whether the physical or logical rebooting is performed, and generates the rebooting message and provides it to the at least one forwarder 210 when the physical or logical rebooting is performed (S508). When the rebooting message is received from the routing controller 200, the at least one forwarder 210 sets the SM bit value in the renewal information table 220 to "1" and operates the timer 212a during a set time period.

The set forwarder among the at least one forwarder 210 provides the renewal information of its renewal information table 220 to the routing controller 200 (S510). The routing controller 200 backs up (or copies) the renewal information of the renewal information table 220 provided from the set forwarder 210 to the renewal information table 204 of the routing controller 200.

Then, the routing controller 200 collects the best and lowest cost routing information while exchanging the routing protocol control message with the adjacent routers again (S512) and sets the forwarding information from the collected routing information (S514).

The routing controller 200 checks the renewal information table 204 of the routing controller 200 to see whether the destination IP address, the index of the next hop table 216 which stores the output interface information for transmitting the packet having the destination IP address to the next hop corresponding to the next hop address, and the index of the L2 table 218 which stores the MAC address related to the output interface exist or not.

The routing controller 200 inserts the index of the next hop table 216 and the index of the L2 table 218 into the newly set forwarding information and transmits it to the at least one forwarder 210 when the destination IP address, the index of the next hop table 216 which stores the output interface information for transmitting the packet having the destination IP address to the next hop corresponding to the next hop address, and the index of the L2 table 218 which stores the MAC address related to the output interface exist.

The routing controller 200 sets the index of the next hop table 216 and the index of the L2 table 218 which do not exist in the renewal information table 204 of the routing controller 200, and inserts them into the newly set forwarding information and transmits it to the at least one forwarder 210 when the destination IP address, the index of the next hop table 216 which stores the output interface information for transmitting the packet having the destination IP address to the next hop corresponding to the next hop address, and the index of the L2 table 218 which stores the MAC address related to the output interface do not exist (S516).

The forwarder 210 receives the rebooting message from the routing controller 200, and classifies the received forwarding information and stores the classified forwarding information in the renewal information table 220, the forwarding table 214, the next hop table 216, and the L2 table 218 (S518).

This procedure is described below in more detail.

After receiving the rebooting message from the routing controller 200, the forwarder 200 checks whether the next hop index contained in the received forwarding information is stored in the renewal information table 220 or not. The forwarder 210 sets the SM bit value corresponding to the index of the next hop table 216 to "0" when the index of the next hop table 216 contained in the received forwarding information is stored in the renewal information table 220.

This represents that the same forwarding information as the forwarding information received from the routing controller 200 is stored in the next hop table 216 and the L2 table 218. Thus, the forwarder 210 forwards the received packets using the forwarding information stored in the forwarding table 214, the next hop table 216 and the L2 table 218 until the re-set forwarding information is received after the rebooting message is received from the routing controller 200.

When the index of the next hop table 216 contained in the forwarding information received after the rebooting message is received is not stored in the renewal information table 220 of the forwarder 210, the forwarder 210 stores in the renewal information table 220 the destination IP address, the index of the next hop table 216 which stores the output interface information for transmitting the packet having the destination IP address to the next hop, the next hop address, and the index of the L2 table 218 which stores the MAC address information related to the output interface, among the forwarding information received from the routing controller 200 after the rebooting message is received, such that they correspond to the bit value of the SM. At this time, the bit value of the SM is set to "0."

The forwarder 210 stores in the forwarding table 214, the destination IP address and the index of the next hop table 216 which stores the output interface information for transmitting the packet having the destination IP address to the next hop, among the forwarding information received from the routing controller 200 after the rebooting message is received.

The forwarder 210 stores in the next hop table 216 the output interface information for transmitting the packet having the destination IP address to the next hop, among the forwarding information received from the routing controller 200 after the rebooting message is received. At this time, the output interface information includes the ID of the forwarder having the corresponding output interface, the MTU of the output interface, the port ID of the output interface for transmitting the packet having the destination IP address to the next hop, and the index of the L2 table 218 which stores the MAC address information related to the output interface.

The forwarder 210 stores in the L2 table 218, the MAC address information among the forwarding information received from the routing controller 200 after the rebooting message is received.

The MAC address information stored in the L2 table 218 includes the MAC address of the forwarder 210 (i.e., source MAC address), the MAC address of the next hop (i.e., destination MAC address), a protocol type, etc. Then, the forwarder 210 deletes the routing information corresponding to the index of the next hop table 216 and the index of the L2 table 218 to which the SM bit value of the renewal information table 220 is set to "1" from the forwarding table 214, the next hop table 216 and the L2 table 218 when the operation of the timer 212*a* of the forwarding control module 212 lapses the set time period and is terminated after the rebooting message is received.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

As described above, according to the present invention, the table for storing the index of the output interface table which contains the output interface information for transmitting the packets respectively received at the routing controller and the forwarder to the next hop and the index of the MAC table which contains the MAC information necessary to transmit the received packets to the next hop is provided, thereby preventing the packet from being lost during the backup of the forwarding information which is performed by the rebooting of the routing controller. In addition, there is no need for a memory for storing the forwarding information before and after the rebooting of the routing controller.

While the present invention has been described with reference to exemplary embodiments thereof, it will be understood by those skilled in the art that various changes in from and detail may be made therein without departing from the scope of the present invention as defined by the following claims.

What is claimed is:

1. A method for managing forwarding information in a routing system having a routing controller and at least one forwarder, the method comprising the steps of:

setting, at the routing controller, forwarding information from routing information collected by exchanging a routing protocol message with adjacent routers and providing said at least one forwarder with said forwarding information;

storing, at said at least one forwarder, in a first table, at least one address information and forwarding identification information corresponding to the address information which are contained in said forwarding information and providing said routing controller with said first table as said routing controller is rebooted;

copying, at said routing controller, said first table to a second table, and when forwarding identification information which corresponds to address information contained in forwarding information re-set from routing information re-collected by exchanging said routing protocol message with said adjacent routers is contained in said second table, providing said at least one forwarder with said address information contained in the re-set forwarding information and said forwarding identification information contained in said second table; and when said forwarding identification information contained in said second table is contained in said first table, maintaining, at said at least one forwarder, said forwarding information set before the rebooting of said routing controller which corresponds to said forwarding identification information contained in said second table.

2. The method of claim 1, further comprising the steps of:

when said forwarding identification information corresponding to said address information contained in said re-set forwarding information is not contained in said second table, setting, at said routing controller, said forwarding identification information corresponding to said address information contained in said re-set forwarding information and providing said at least one forwarder with said forwarding identification information together with said address information contained in said re-set forwarding information; and when said re-set forwarding identification information is contained in said first table, maintaining, at said at least one forwarder, said forwarding information set before rebooting of said routing controller which corresponds to said re-set forwarding identification information.

3. The method of claim 1, with the address and the address contained in said re-set forwarding information comprising at least one of a destination Internet protocol address at which a packet received at said at least one forwarder is to be transmitted and a next hop address at which the packet received at said at least one forwarder is to be forwarded.

4. The method of claim 1, with said forwarding identification information, and said forwarding identification information contained in said second table comprising at least one of an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table which contains media access control information of said next hop.

5. The method of claim 1, with said first table comprising stale mark information which corresponds to said at least one address information and said forwarding identification corresponding to said at least one address information and which is used for said at least one forwarder to delete said forwarding information corresponding to said forwarding identification information contained in said first table after rebooting of said routing controller.

6. The method of claim 1, with said at least one forwarder comprising a timer which operates during a set time period.

7. The method of claim 2, with said re-set forwarding identification information comprising at least one of an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table which includes media access control information of said next hop.

8. A computer-readable medium having computer-executable instructions for performing the method of claim 1.

9. A routing system, comprising:

at least one forwarder, and a routing controller setting forwarding information from routing information collected by exchanging a routing protocol message with adjacent routers and providing said at least one forwarder with said forwarding information, said at least one forwarder storing, in a first table, at least one address information and forwarding identification information corresponding to said address information which are contained in said forwarding information and providing said routing controller with said first table as said routing controller is rebooted, said routing controller copying said first table to a second table, and when forwarding identification information which corresponds to address information contained in forwarding information re-set from routing information re-collected by exchanging said routing protocol message with said adjacent routers is contained in said second table, providing said at least one forwarder with said address information contained in said re-set forwarding information and said forwarding identification information contained in said second table, and said at least one forwarder, when said forwarding identification information contained in said second table is contained in said first table, maintaining said forwarding information set before said rebooting of said routing controller which corresponds to said forwarding identification information contained in said second table.

10. The system of claim 9, comprised of said routing controller, when said forwarding identification information corresponding to said address information contained in said re-set forwarding information is not contained in said second table, sets forwarding identification information corresponding to said address information contained in said re-set forwarding information and provides said at least one forwarder with said forwarding identification information together with said address information contained in said re-set forwarding information; and said at least one forwarder, when said re-set forwarding identification information is contained in said first table, maintains said forwarding information set before rebooting of said routing controller which corresponds to said re-set forwarding identification information.

11. The system of claim 9, with said address and said address contained in said re-set forwarding information comprising at least one of a destination Internet protocol address at which a packet received at said at least one forwarder is to be transmitted and a next hop address at which said packet received at said at least one forwarder is to be forwarded.

12. The system of claim 9, with said forwarding identification information and said forwarding identification information contained in said second table comprising at least one of an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table which contains media access control information of said next hop.

13. The system of claim 9, with said first table comprising stale mark information which corresponds to said at least one address information and said forwarding identification information corresponding to said at least one address information and which is used for said at least one forwarder to delete said forwarding information corresponding to said forwarding identification information contained in said first table.

14. The system of claim 9, with said at least one forwarder comprising a timer which operates during a set time period.

15. The system of claim 10, with said re-set forwarding identification information comprising at least one of an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table which contains media access control information of said next hop.

16. A computer-readable medium having computer-executable instructions comprised of:
    setting forwarding information from routing information collected by exchanging a routing protocol message with adjacent routers and providing at least one forwarder with said forwarding information;
    storing, in a first table, at least one address information and forwarding identification information corresponding to the address information which are contained in said forwarding information and providing a routing controller with said first table as said routing controller is reset; and
    duplicating said first table to a second table, and when forwarding identification information which corresponds to address information contained in forwarding information re-set from routing information re-collected by exchanging said routing protocol message with said adjacent routers is contained in said second table, providing said at least one forwarder with said address information contained in the re-set forwarding information and said forwarding identification information contained in said second table.

17. The medium of claim 16, with the instructions further comprising the steps of:
    when said forwarding identification information contained in said second table is in said first table, maintaining, at said at least one forwarder, said forwarding information set before the rebooting of said routing controller which corresponds to said forwarding identification information contained in said second table;
    when said forwarding identification information corresponding to said address information contained in said re-set forwarding information is not contained in said second table, setting, at said routing controller, said forwarding identification information corresponding to said address information contained in said re-set forwarding information and providing said at least one forwarder with said forwarding identification information together with said address information contained in said re-set forwarding information; and
    when said re-set forwarding identification information is contained in said first table, maintaining, at said at least one forwarder, said forwarding information set before rebooting of said routing controller which corresponds to said re-set forwarding identification information.

18. The medium of claim 17, with:
    the address and the address contained in said re-set forwarding information comprising at least one of a destination Internet protocol address at which a packet received at said at least one forwarder is to be transmitted and a next hop address at which the packet received at said at least one forwarder is to be forwarded, and
    said forwarding identification information, and said forwarding identification information contained in said second table comprising at least one of an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table including media access control information of said next hop.

19. The medium of claim 18, with:
    said first table comprising stale mark information which corresponds to said at least one address information and said forwarding identification corresponding to said at least one address information and which is used for said at least one forwarder to delete said forwarding information corresponding to said forwarding identification information contained in said first table after rebooting of said routing controller, and
    said at least one forwarder comprises a timer which operates during a set time period.

20. The medium of claim 17, with said re-set forwarding identification information comprising an index of an output interface table which contains output interface information of said at least one forwarder necessary to transmit a packet received at said at least one forwarder to a next hop, output interface media access control information necessary to transmit said packet received at said at least one forwarder to said next hop, and an index of a media access control table which includes media access control information of said next hop.

* * * * *